(12) United States Patent
Lussey

(10) Patent No.: US 10,818,406 B2
(45) Date of Patent: Oct. 27, 2020

(54) ELECTRICALLY CONDUCTIVE COMPOSITION

(71) Applicant: David Lussey, Richmond North Yorkshire (GB)

(72) Inventor: David Lussey, Richmond North Yorkshire (GB)

(73) Assignee: David Lussey, Richmond, North Yorkshire (GB)

( * ) Notice: Subject to any disclaimer, the term of this patent is extended or adjusted under 35 U.S.C. 154(b) by 0 days.

(21) Appl. No.: 16/062,202

(22) PCT Filed: Dec. 15, 2016

(86) PCT No.: PCT/GB2016/053943
§ 371 (c)(1),
(2) Date: Jun. 14, 2018

(87) PCT Pub. No.: WO2017/103592
PCT Pub. Date: Jun. 22, 2017

(65) Prior Publication Data
US 2019/0362866 A1    Nov. 28, 2019

(30) Foreign Application Priority Data

Dec. 15, 2015  (GB) .................................. 1522114.6
Jun. 28, 2016  (GB) .................................. 1611192.4

(51) Int. Cl.
*H01B 1/22*  (2006.01)
*G01L 1/20*  (2006.01)
(Continued)

(52) U.S. Cl.
CPC ................ *H01B 1/22* (2013.01); *G01L 1/205* (2013.01); *H01B 1/24* (2013.01); *H01C 10/106* (2013.01);
(Continued)

(58) Field of Classification Search
CPC .............................. H01B 3/004; H01C 10/106
(Continued)

(56) References Cited

U.S. PATENT DOCUMENTS 4,470,898 A * 9/1984 Penneck ................ H01B 3/004
                                                                  252/511
5,541,570 A * 7/1996 McDowell ........... H01C 10/106
                                                                  338/47

FOREIGN PATENT DOCUMENTS

EP     0699964 A1    3/1996
GB     2450587 A     12/2008
(Continued)

OTHER PUBLICATIONS

Weidenfeller et al., "Thermal and electrical properties of magnetite filled polymers", Composites: Part A 33, (2002), pp. 1041-1053.*
(Continued)

*Primary Examiner* — Khanh T Nguyen
(74) *Attorney, Agent, or Firm* — Jackson Walker LLP

(57) ABSTRACT

A pressure sensitive electrically conductive composition comprises a contained quantity of magnetite particles, wherein the quantity of magnetite particles includes a distribution of particle sizes between sub-micron and tens of microns, and wherein the magnetite particles have a plurality of planar faces, adjacent planar faces connected at a vertex, the particles each having a plurality of vertices wherein the magnetite particles are irregular in shape and have a low aspect ratio.

18 Claims, 6 Drawing Sheets

(51) Int. Cl.
*H01B 1/24* (2006.01)
*H01C 10/10* (2006.01)
*H01C 10/30* (2006.01)
*C09D 5/24* (2006.01)
*H01G 4/20* (2006.01)

(52) U.S. Cl.
CPC ............. *H01C 10/306* (2013.01); *C09D 5/24* (2013.01); *H01G 4/206* (2013.01)

(58) Field of Classification Search
USPC ............................................ 252/511; 338/47
See application file for complete search history.

(56) References Cited

FOREIGN PATENT DOCUMENTS

| | | | |
|---|---|---|---|
| GB | 2541288 A | 2/2017 | |
| JP | 2005282652 | 10/2005 | |
| WO | 2010039799 A1 | 4/2010 | |

OTHER PUBLICATIONS

Razzq et al., "Thermal, electrial and magnetic studies of magnetite filled polyurethane shape memory polymers", Material Science and Enginerrting A 44, (2007), pp. 227-235.*
Razzaq et al, Materaisl Science and Engineering A 444 (2007), pp. 227-235 "Thermal, Electrical and Magnetic Studies of Magnetite Filled Polyurethane Shape Memory Polymers," 9 pages Aug. 23, 2006.
Weidenfeller et al, Composites: Part A 33 (2002), pp. 1041-1053 "thermal and Electrical Properties of Magnetite Filled Polymers," 13 pages Jul. 1, 2002.
GB Application No. GB1621358.9, Patents Act 1977: Search Report under Section 17(5), 4 pages dated Jun. 20, 2017.
Intl. Application No. PCT/GB2016/053943, PCT International Search Report, 4 pages dated Mar. 27, 2017.

\* cited by examiner

ELECTRICALLY CONDUCTIVE COMPOSITION

FIELD OF THE INVENTION

The present invention relates to an electrically conductive composition and in particular to such a composition comprising magnetite in a particulate form.

BACKGROUND OF THE INVENTION

Electrically conductive compositions which exhibit changing electrical resistance when subject to compressive or tensile forces are known. Typically, these compositions comprise void bearing particles and conduct by quantum tunnelling.

Quantum tunnelling describes a conduction mechanism which occurs when the inter particle distance decreases such that the insulating barriers between adjacent conductive particles are so thin that quantum tunnelling occurs through the thin insulating barriers. The presence of spikes and voids in the filler particles amplifies the electric fields within the composites. Large resistance ranges are a consequence of quantum tunnelling.

Field-enhanced quantum tunnelling occurs with filler particles that contain voids. Voids are defined by considering an imaginary closed surface tracing the protrusions on the particles. If the volume enclosed by the imaginary closed surface is larger than the volume of the filler particle this indicates the existence of protrusions on the filler particles. These protrusions are the source of field-enhanced tunnelling. The degree of field enhancement is dependent on the number and sharpness of the protrusions. It is voids between external protrusions that are referred to in this specification, not voids in hollow materials such as carbon nanotubes.

Void bearing particles are particles such as spiky nickel.

GB2450587 describes an electrically conductive polymer composition comprising a non-conductive polymer binder, first electrically conductive filler particles that are void bearing and second electrically conductive filler particles that are acicular.

The invention described in GB2450587 is said to reduce noise and to allow the relationship between compression and change in resistance to be better controlled.

Whilst the use of electrically conductive acicular particles allow the start resistance of the composite to be reduced, a start resistance nevertheless remains. Further, whilst the use of electrically conductive acicular particles may reduce noise, the electrical signal nevertheless remains noisy, since noise is associated with field enhanced quantum tunnelling.

Weifenfeller, Hoffer and Schilling in Thermal and Electrical Properties of Magnetite Filled Polymers, Composites: Part A 33 (2002) 1041-1053, 1 Jul. 2002, found that when a particularly pure form of naturally occurring magnetite ($Fe_3O_4$) that contains only a very small proportion of other matter in the form of $SiO_2$ is mixed with a polymer binder by extrusion or injection moulding, where the loading of magnetite is greater than 30% by volume, there is a drop in resistivity of the composite material and that the percolation threshold is reached when the loading of magnetite reaches 33% by volume.

It would be desirable to produce an electrically conductive polymer that is sensitive to changes in pressure, has a wide working range and which exhibits low noise.

Surprisingly, it has been found that a composition comprising the particularly pure form of naturally occurring magnetite ($Fe_3O_4$) that contains only a very small proportion of other matter in the form of $SiO_2$, used by Weifenfeller, Hoffer and Schilling can produce a pressure sensitive electrically conductive composition with enhanced performance characteristics. The form of magnetite utilised in the invention typically comprises a minimum of 98.1% magnetite and a maximum of 0.3% $SiO_2$.

Further, it has been found that by mixing the aforesaid particular form of magnetite with particles of different shape, such as dendritic or spherical particles of electrically conductive material, even greater enhancement of performance characteristics may be obtained.

SUMMARY OF THE INVENTION

According to first aspect of the invention there is provided a pressure sensitive electrically conductive composition comprising a contained quantity of first electrically conductive particles, which first electrically conductive particles are magnetite particles, wherein the quantity of magnetite particles includes a distribution of particle sizes between submicron and tens of microns, and wherein the magnetite particles have a plurality of planar faces, adjacent planar faces connected at a vertex, the particles each having a plurality of vertices wherein the magnetite particles are irregular in shape and have a low aspect ratio.

The resistance of the electrically conductive composition changes in accordance with the pressure exerted thereon, the resistance decreasing with increased applied pressure and increasing with reduced applied pressure.

Preferably, the resistance of the composition changes between a quiescent state in the absence of pressure and an electrically conducting state when the composition is subject to an applied pressure. Preferably, in the quiescent state the composition behaves as an insulator.

The electrically conductive composition may be contained in many different ways. Typically, the composition would be contained in a binder as described below. However, other means of containment are possible. For example, the composition in a particulate form and without a binder could be placed between two elements, for example two spaced apart plates. Alternatively, the composition in particulate form without a binder could be placed in pockets or interstices within a fabric, or between layers of a fabric, or could be distributed within a yarn during manufacture. What is required is that the quantity of electrically conductive particles is contained such that when a pressure is applied thereto the distance between the particles changes. This change can be read by associated electrodes as a change in resistance.

The shape of particles in the distribution may fall under the particle shape definitions of, "oblate", that is tabular, and/or "bladed", that is a flat or elongated shape form (see Dictionary of Earth Sciences 1999).

Preferably, the distribution of particle size at $d_{50}$ (using the cyclosizer method) is between 50 and 75 micron and preferably between 60 and 65 micron. The distribution of particle size at $d_{50}$ may be between 20 and 25 micron. The distribution of particle size at $d_{50}$ may be between 5 and 15 micron and preferably is 10 micron.

The particle size distribution may be narrowed in order to obtain particles of a more similar size, for example by classification. For example, the proportion of a specified range of particle sizes or a specified size of particle within the distribution may be reduced, and the reduction may be to the point of particles of a certain size or size range being removed. The proportion of particles below a certain size, for example sub-micron size particles, in the distribution may be reduced or removed from the distribution. Alternatively or additionally the proportion of particles above a certain size in the distribution, for example greater than 10 micron, may be reduced or removed from the distribution.

Individual particles may be further reduced in size by pulverisation.

The change in resistance exhibited by the composition of the invention is influenced by the size of the magnetite particles in the quantity thereof and the relative sizes of different magnetite particles to each other in the quantity of magnetite particles. Hence, by selecting the sizes of magnetite particles in the quantity thereof the change in resistance exhibited by the composition can be tuned.

The electrically conductive composition may include a second type of electrically conductive particle of a different shape to the first electrically conductive particle. The second type of electrically conductive particle may have one of the following shapes: spherical, void bearing, plate like, and needle like.

Including a second electrically conductive particle of a different shape has been found to increase or reduce the sensitivity of the composition. Also, the size of the particles of different shape has been found to affect the sensitivity of the composition. That is, a similar force applied to the composition results in a greater or reduced change in resistance.

The second electrically conductive particles may be formed of conductive or semi-conductive materials, for example: copper, iron and its oxides, silver and its oxides. Alternatively, they can be shaped core particulates coated with conductive or semi-conductive materials.

The electrically conductive composition may be contained in a binder, which is preferably an elastomeric polymer binder. When contained in a binder, the resulting polymer composition preferably does not conduct, that is presents no detectable start resistance when in an unstressed state. When the resulting polymer composition is stressed, for example by applying a force to the surface current flows. When the cause of stress in the polymer composition is removed, the composition returns to its unstressed state and the resistance characteristics pertaining to the unstressed state of the composition.

Typically, the binder is an electrical insulator.

The binder may be a silicone polymer binder, which may comprise up to ten parts of white spirit to one part of silicone by weight.

Alternatively, the binder may comprise polyurethane, for example a water based polyurethane thinned with up to five parts of water to one part of polyurethane by weight.

The binder may comprise polyethylene.

The binder may comprise acrylic which may be a thermoplastic or a thermosetting plastic.

The binders may be water or solvent based.

The binder is capable of yielding to pressure. The change in distance separating the electrically conductive particles upon a change in applied pressure results in the change in resistance of the composition. Hence, when a force is applied to the composition contained in a binder the binder allows those particles to come closer together in order for the resistance to change.

The electrically conductive composition of the invention when contained in a binder may be utilised in many different forms, the following list being exemplary and not limiting: coatings, paint, grease, ink, 3d printer feed material; thin films, sheet material, filaments, filament coatings, textiles.

The binder thickness between particles is controlled by the proportion of binder to particles and by the selection of solvents used to provide a binder in a liquid state for mixing, and which turns to a semi-rigid state post mixing. The solvent may be selected so that it evaporates to leave a thin polymer layer around the particles. In order to evaporate the solvent, heat (between 90 and 100 degrees Celsius) may be applied during and/or after the mixing phase. Where the binder is a polymer, the polymer may be subject to a cross-linking process to create a semi-rigid substance post mixing.

Advantageously, the binder forms a thin layer around each particle in the particle distribution. The layer thickness is typically in the order of tens of nano-metres.

Preferably, the proportion of first or first and second electrically conductive particles to binder is greater than or equal to 33% by weight and more preferably is greater than or equal to 75% by weight and still more preferably greater than or equal to 90%.

Typically for thermoplastic polymer binders, the proportion of first or first and second electrically conductive particles to polymer is greater than or equal to 70% conductive particles to 30% polymer binder and more preferably greater than or equal to 80% conductive particles to 20% polymer binder, and more preferably the proportion of conductive particles to polymer binder is greater than or equal to 82% conductive particles to 18% polymer binder.

The electrically conductive particles may be coated with a binder comprising a silicone polymer. The silicone polymer may be thinned with up to 10 parts of white spirit to one part of silicone (by weight). The binder may be formed in a thin layer.

The composition comprising magnetite particles or a mixture of magnetite particles and a second electrically conductive particle and a binder may be printable into a two dimensional layer, in particular where median particle size is smaller, for example in the size range of examples 1 and 2 in table 1 below. With larger median particle sizes for example in the size range of example 3 in table 1 below, the composition comprising magnetite particles and a binder may form a suitable feed stock for three-dimensional printing.

According to another aspect of the invention there is provided a sensor comprising two layers of semi-conductor separated by a layer of pressure sensitive electrically conductive composition according to the first aspect of the invention, each layer of semi-conductor having at least one electrode in contact therewith and wherein the at least one electrode of one layer of semi-conductor is arranged orthogonal to the at least one electrodes of the other semi-conducting layer.

Each layer of semi-conductor may have two or more two electrodes attached thereto, and wherein the two or more electrodes of one layer of semi-conductor are arranged orthogonal to the two or more electrodes of the other semi-conducting layer Such a sensor is able to detect the application and magnitude of a force applied in a plane perpendicular to the plane of the sensor. The sensor may be configured such that the position of the applied force may also be detected.

According to another aspect of the invention there is provided a method of manufacturing a pressure sensitive electrically conductive composition according to the first aspect of the invention, the method comprising the steps of:

mixing the electrically conductive particles with the binder until the mixture thereof is homogeneous.

The method of manufacturing a pressure sensitive electrically conductive composition may include the additional step of heating the binder to reduce the viscosity thereof, prior to and/or during the step of mixing the electrically conductive particles with the binder.

BRIEF DESCRIPTION OF THE DRAWINGS

In the Drawings, which illustrate preferred embodiments of the invention.

DETAILED DESCRIPTION OF THE PREFERRED EMBODIMENTS

Figure 1:
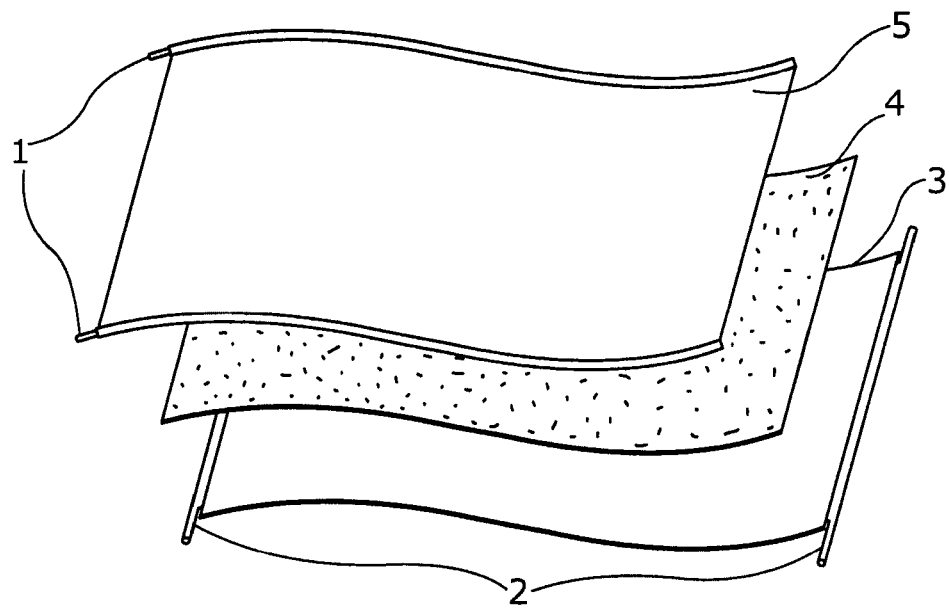
FIG. 1 is a schematic representation of a first arrangement of a sensor.
Figure 2:
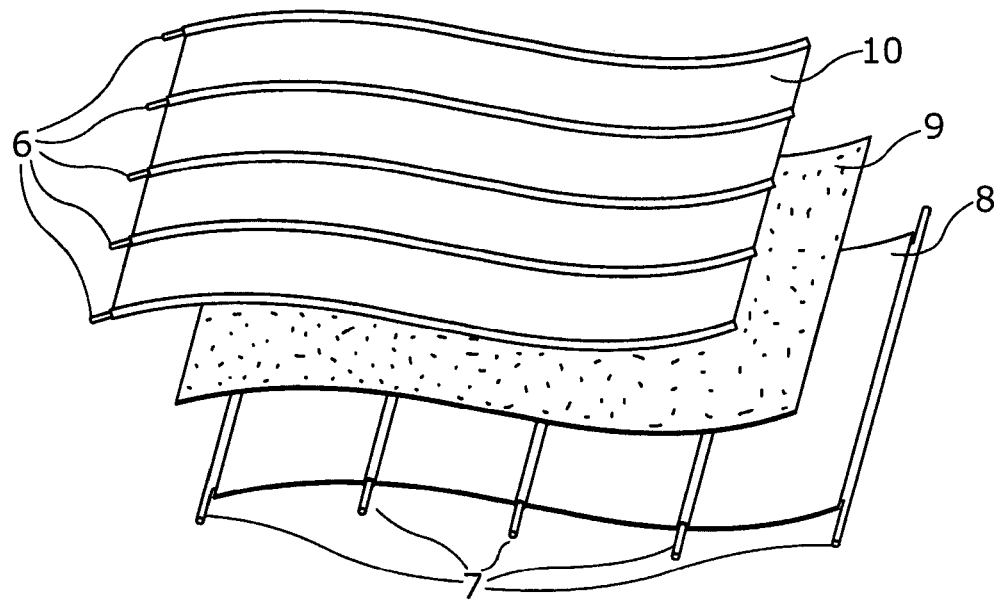
FIG. 2 is a schematic representation of an alternative arrangement of a sensor.

FIGS. 1 and 2 both illustrate pressure sensors.

The sensor shown in FIG. 1 is able to detect both the x-y position of a force applied to the surface of the sensor and also the force component in the direction z.

The sensor illustrated in FIG. 1 comprises a first layer which includes a pair of spaced apart conductive elements 1, which may comprise electrode strips of a metal such as silver. The conductive elements 1 are joined together by layer of semi-conductive material 5. The semi-conductive material 5 may be a polymer filled with a semi-conductor, a film or paper coated or impregnated with semi-conductor or a textile filled, coated or impregnated with semi-conductor. In this embodiment the semi-conductor is carbon. The resistance between the conductive elements across the semi-conductor material 5 is approximately 5 k Ohms, although this resistance could vary greatly depending on the input requirement of the electronic interface to which the conductive element is attached.

The sensor comprises a second layer of the same construction as the first layer. However in the assembled sensor the conductive elements 2, which are situated at the edges of the semi-conductive material 3, lie orthogonal to the conductive elements 1 of the first layer.

A third layer 4 is situated between the first and second layers, the third layer 4 being formed of a sheet of polymer material, such as polyethylene, loaded with magnetite particles of the type described above and in Table 1 below. The third layer 4 is anisotropically conductive. When a pressure is exerted on or removed from the third layer 4 it alters its resistance according to the pressure applied. Conduction occurs only in a very small region around the point of application of the force. Typically, a force is exerted in the z direction on the third layer 3 by means of a force acting on the outside of one of the first and second layers, which force is reacted through the other of the first and second layer, resulting in compression of the third layer 4 around the point of application of a force in the z direction.

A current that is passed, for example, through the electrodes 2 is conducted by layer 3 and is detectable via the electrodes 2. The sensitivity of the material of the third layer to pressure means that not only can the position of the force in the z direction be established, but also an indication of the magnitude of the force component in the z direction.

The sensor shown in FIG. 2 differs from that show in FIG. 1 in that more electrodes 6, 7 are present in the first and second layers respectively. Instead of electrodes being located at the outer edges of the semi-conductive material 8, 10, electrodes 6, 7 are provided at regular spaced apart locations across the sheets of semi-conductive material 8, 10. The result is a grid of cells. Such a sensor may be used to measure the load variation across the sensor when a distributed load is placed on the sensor. This is because a location and force measurement can be determined within each cell of the sensor.

Table 1 below illustrates the particle distributions for the different specifications of magnetite used in Examples 1 to 3 below:

| Particle size distribution (cyclosizer method) | Example 1 Magnetite | Example 2 Magnetite | Example 3 Magnetite |
| --- | --- | --- | --- |
| d10 (micron) | 5 | 6 | 9 |
| d50 (micron) | 10 | 22 | 63 |
| d90 (micron) | 25 | 50 | 180 |
| particle characteristics | irregularly shaped, low aspect ratio | | |

The magnetite used in each of the examples 1 to 3 is sourced from LKAB Minerals and comprises a magnetite power manufactured from the natural iron oxide known as magnetite. The magnetite contains at least 98.1% Fe3O4 and not more than 0.3% SiO2.

Figure 3:
FIG. 3 is a micrograph of a distribution of the magnetite particles.

A typical distribution of particles is shown in FIG. 3.

In a first set of samples for each of examples 1 to 3, the magnetite particles were coated with a binder comprising a thin layer of water-based polyurethanes thinned with up to five parts of water to one part of polyurethane (by weight). The polyurethane used was Witcobond 781 dispersion thinned 1:1 with water. The relative proportion by weight of polymer (after thinning with water as described) to magnetite was: for example 1, 7% polymer to 93% magnetite; for example 2, 6% polymer to 94% magnetite; and for example 3, 5% polymer to 95% magnetite.

Coating of the particles was achieved by mixing together the coating material and the particulate magnetite. Magnetite particles are significantly less susceptible to shear forces than spiky nickel particles and hence compositions utilising magnetite may be mixed for longer and with greater shear forces without incurring damage. Nevertheless, a low shear mixing regime was used.

The magnetite and the binder are mixed only long enough until a homogeneity of the mix is visible to the eye. At that point the resulting composite was found to be electrically anisotropic with a very large resistance range which with the composite in the quiescent state starts in the region of an insulator and can be changed over many orders of magnitude by the application of a force to the composite. The polymers used in the invention have inherent flexibility and revert to their quiescent state when the operating force is removed.

Mixing the water based polymer composites is achieved by adding the magnetite to the liquid polymer in a container under the action of a stirrer (a blade stirrer was used). The mixing is ended as soon as the components are seen to be totally combined. The resulting composite liquid is useful as an ink, coating or feedstock version of the invention. Witcobond 781 is a thermoset based polymer used in this invention.

A mixing regime suitable for mixing magnetite with thermoplastic polymers such as polythene consists of a heated single powered metal roller loaded with a known quantity of thermoplastic polymer. A measured amount of magnetite is dropped onto the surface of the rotating polymer and worked into the mix with a blade. When the components are seen to be combined thoroughly the resulting composite can be stripped from the roller using a scraper blade. This or similar methods may be used to make versions of the composite with anisotropic properties suitable for use as heat forming feedstock and hot melt adhesives.

The methods above describe mixing magnetite with a polymer until the components are seen to be totally combined. By repeating the mixing process using sight to determine the degree of mixing, it is possible to define the required mixing for known quantities of known materials under known mixing conditions in terms of time or other parameters related to mixing the composition, thereby removing the need for observation.

Figure 4:
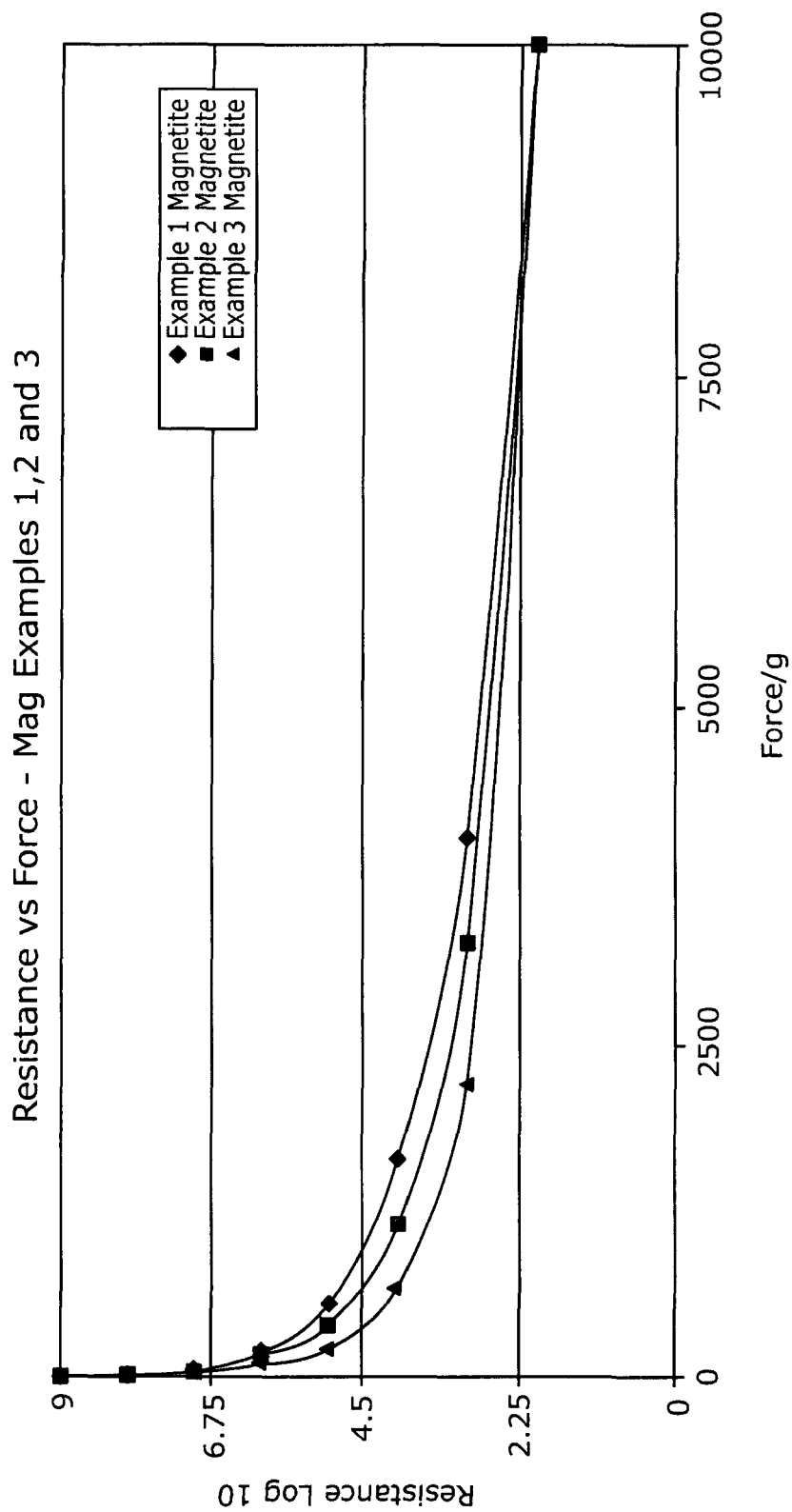
FIG. 4 is a graph illustrating the relationship between applied force and resistance for three example compositions according to the invention.

It was found that the electrical response to pressure was greater for the magnetite particle size distribution of example 2 than example 1, and greater still for example 3. This is illustrated in FIG. 4, which demonstrates the effect on resistance of force applied to the three different compositions shown in Table 1 above, the particles of each example within and coated by a thin layer of polyurethane polymer binder as described above. Also evident from the graphs shown in FIG. 4 is that for each of the examples 1 to 3, there is a very rapid fall in resistance upon application of only a small force.

Figure 5:
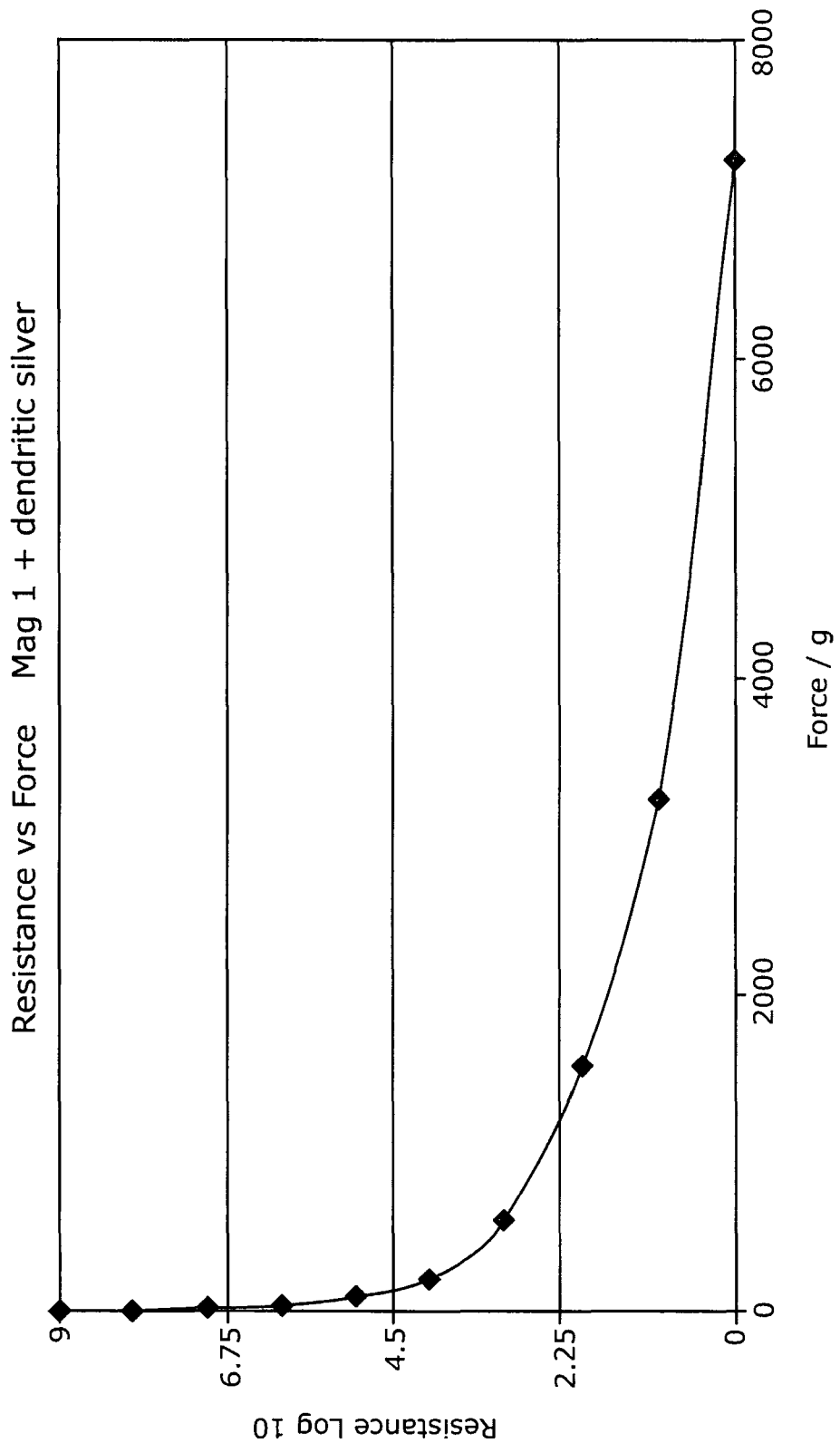
FIG. 5 is a graph illustrating the relationship between applied force and resistance for another example composition according to the invention.

FIG. 5 demonstrates the effect on resistance of force applied to a composition where the composition of example 1 has a proportion of dendritic silver powder added thereto in a proportion by weight of two parts magnetite of example 1 to one part of silver powder. The particle size of the silver powder was predominantly in the range 10 to 15 micron. The relative proportion by weight of polymer to the magnetite/dendric silver powder was 7% polymer to 93% magnetite/dendric silver powder.

The magnetite/silver composition exhibits a large resistance range, from an open circuit when no force is applied to a resistance of less than 1 Ohm when a force of 7255 grammes is applied. Further, this composition exhibits very low noise, less noise than the compositions of Examples 1 to 3 which include electrically conductive particles of only one material, namely: magnetite.

For each of Examples 1 to 3 and the example where silver powder and the magnetite particles or Example 1 are mixed together, the electrically conductive particles were mixed together in a polyurethane polymer binder as described above, and were laid down onto a 50×50 mm piece of a fine nylon net having a thickness of 0.255 mm. The finished thickness of the samples was approximately 0.30 mm.

Figure 6:
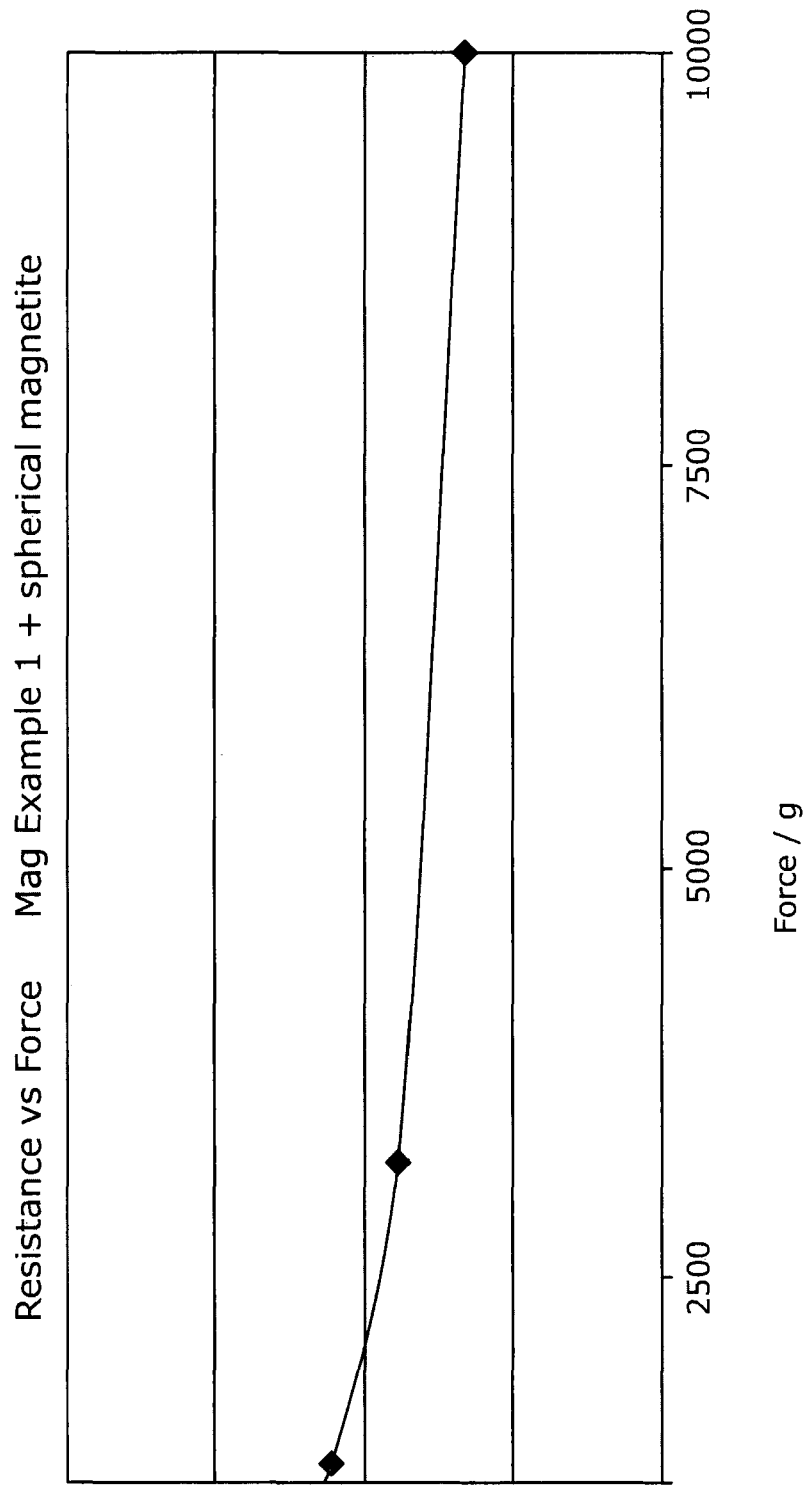
FIG. 6 is a graph illustrating the relationship between applied force and resistance for another example composition according to the invention.

FIG. 6 illustrates demonstrates the effect on resistance of force applied to a composition where the composition of example 1 has a proportion of spherical magnetite added thereto. The graph shows that the synthetic magnetite reduces the sensitivity of the MAG 1. The spherical synthetic magnetite is Bayferrox 4330 and the ratio of synthetic mag to MAG 1 is 1:1. As with the examples described above the polymer binder was Witcobond 781 mixed 1:1 with water applied to the same type of textile test piece, that is a fine nylon net having a thickness of 0.255 mm. The finished thickness of the samples was approximately 0.50 mm. The relative proportion by weight of polymer to the MAGI/synthetic magnetite was 10% polymer to 90% MAGI/synthetic magnetite.

Figure 7:
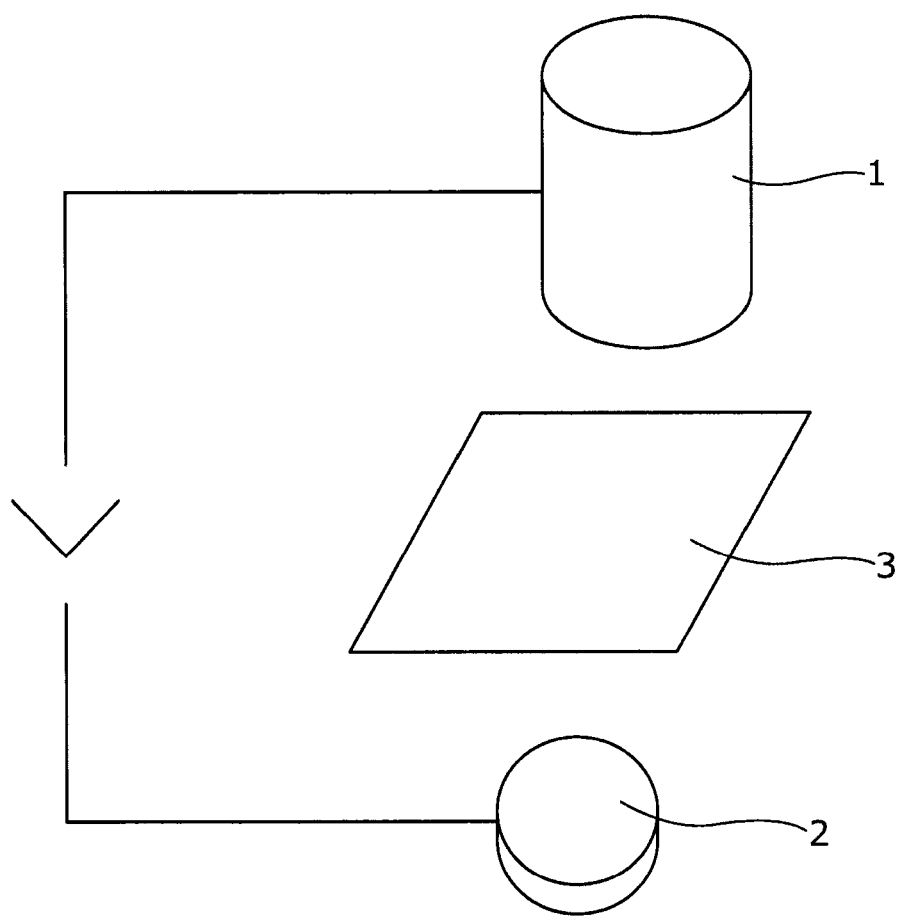
FIG. 7 is a schematic representation of the test electrode used to collect the data represented in the graphs of FIGS. 4 to 6.

The test electrode used in the Examples is illustrated in FIG. 7 and comprised an upper electrode 1 in the form of a 5 mm diameter gold plated rod conductor, a lower electrode 2 in the form of a silver plated metal disc 10 mm in diameter and the sample 3. The upper and lower electrodes are brought into contact with the sample 3, and a potential difference was applied through the electrodes 1, 2 to the sample. An increasing force was applied to the sample 3 by the electrodes 1, 2. The applied force was measured. The change in current was measured and the changing resistance calculated.

The electrically conductive compositions described herein are advantageous over the prior art because: they use less costly materials in their manufacture; the particles are more robust and therefore the requirement to control applied shear forces during mixing is reduced; they provide an anisotropic resistance change response to applied pressure and with reduced noise when compared to the prior art materials. Both magnetite and silver are safe for use in contact with human skin and food products; nickel and many other things are not.

The invention claimed is:

1. A composition comprising a quantity of electrically conductive particles including first electrically conductive particles, and an electrically insulating binder, wherein the first electrically conductive particles are magnetite particles, and the quantity of magnetite particles includes a distribution of particle sizes between sub-micron and tens of microns, and wherein the magnetite particles have a plurality of planar faces, adjacent planar faces connected at a vertex, the particles each having a plurality of vertices wherein the magnetite particles are irregular in shape, the electrically conductive particles contained in the binder, wherein the binder forms a layer around each electrically conductive particle, and wherein the composition is electrically anisotropic and pressure sensitive, the electrical resistance of the composition changing immediately and only around the point of exertion of pressure on the composition, the change in resistance being anisotropic and in accordance with the pressure exerted thereon, the resistance reducing with increased applied pressure and increasing with reduced applied pressure, between a quiescent state in the absence of pressure and an electrically conducting state when the composition is subject to an applied pressure.

2. A pressure sensitive electrically conductive composition according to claim 1, wherein the shape of the first electrically conductive particles in the distribution fall under the particle shape definitions of, "oblate", that is tabular, and/or "bladed", that is a flat or elongated shape form.

3. A pressure sensitive electrically conductive composition according to claim 1 or 2, wherein the distribution of particle size of the first electrically conductive particles at $d_{50}$ is one of: between 50 and 75 micron; between 60 and 65 micron; between 20 and 25 micron; between 5 and 15 micron; and 10 micron.

4. A pressure sensitive electrically conductive composition according to claim 1, wherein the distribution of particle sizes between sub-micron and tens of microns in the quantity of magnetite particles includes sub-micron sized particles and particles that are tens of microns in size.

5. A pressure sensitive electrically conductive composition according to claim 1, further comprising a second type of electrically conductive particle of a different shape to the first electrically conductive particle.

6. A pressure sensitive electrically conductive composition according to claim 5, wherein the second type of electrically conductive particle has one of the following shapes: void bearing, plate like, needle like and spherical.

7. A pressure sensitive electrically conductive composition according to claim 5 or 6, wherein the second type of electrically conductive particle is selected from the group comprising: silver; nickel; copper and iron.

8. A pressure sensitive electrically conductive composition according to claim 7, wherein the binder forms a thin layer around each particle in the particle distribution.

9. A pressure sensitive electrically conductive composition according to claim 8, wherein the thickness of the thin layer is in the order of 10 nano-metres.

10. A pressure sensitive electrically conductive composition according to claim 5, wherein the particle size of the second type of electrically conductive particles is between 10 and 15 micron.

11. A pressure sensitive electrically conductive composition according to claim 1, wherein the resistance of the composition decreases by more than one order of magnitude with increased applied pressure and increases towards a quiescent state as the applied pressure is reduced.

12. A pressure sensitive electrically conductive composition according to claim 11, wherein the proportion of magnetite particles to binder is one of: greater than or equal to 33% by weight; greater than or equal to 75% by weight; and greater than or equal to 90%.

13. A pressure sensitive electrically conductive composition according to claim 1, wherein the binder is a polymer binder.

14. A pressure sensitive electrically conductive composition according to claim 13, wherein the polymer is one of: a silicone polymer, a polyurethane polymer; polyethylene and an acrylic polymer.

15. A sensor comprising two layers of semi-conductor separated by a layer of a composition comprising a quantity of electrically conductive particles including first electrically conductive particles, and an electrically insulating binder, wherein the first electrically conductive particles are magnetite particles, and the quantity of magnetite particles includes a distribution of particle sizes between sub-micron and tens of microns, and wherein the magnetite particles have a plurality of planar faces, adjacent planar faces connected at a vertex, the particles each having a plurality of vertices wherein the magnetite particles are irregular in shape, the electrically conductive particles contained in the binder, wherein the binder forms a layer around each electrically conductive particle, and wherein the composition is electrically anisotropic and pressure sensitive, the electrical resistance of the composition changing immediately and only around the point of exertion of pressure on the composition, the change in resistance being anisotropic and in accordance with the pressure exerted thereon, the resistance reducing with increased applied pressure and increasing with reduced applied pressure, between a quiescent state in the absence of pressure and an electrically conducting state when the composition is subject to an applied pressure, each layer of semi-conductor having at least one electrode attached thereto and wherein the at least one electrode of one layer of semi-conductor is arranged orthogonal to the at least one electrodes of the other semi-conducting layer.

16. A sensor according to claim 15, wherein each layer of semi-conductor has two or more two electrodes attached thereto, and wherein the two or more electrodes of one layer of semi-conductor are arranged orthogonal to the two or more electrodes of the other semi-conducting layer.

17. A method of manufacturing a composition comprising a quantity of electrically conductive particles including first electrically conductive particles, and an electrically insulating binder, wherein the first electrically conductive particles are magnetite particles, and the quantity of magnetite particles includes a distribution of particle sizes between sub-micron and tens of microns, and wherein the magnetite particles have a plurality of planar faces, adjacent planar faces connected at a vertex, the particles each having a plurality of vertices wherein the magnetite particles are irregular in shape, the electrically conductive particles contained in the binder, wherein the binder forms a layer around each electrically conductive particle, and wherein the composition is electrically anisotropic and pressure sensitive, the electrical resistance of the composition changing immediately and only around the point of exertion of pressure on the composition, the change in resistance being anisotropic and in accordance with the pressure exerted thereon, the resistance reducing with increased applied pressure and increasing with reduced applied pressure, between a quiescent state in the absence of pressure and an electrically conducting state when the composition is subject to an applied pressure, the method comprising the step of:

provideng the electrically conductive particles and the binder; and mixing the electrically conductive particles with the binder until the mixture thereof is homogeneous.

18. A method of manufacturing a composition according to claim 17, including the additional step of heating the binder to reduce the viscosity thereof, prior to and/or during the step of mixing the electrically conductive particles with the binder.

* * * * *